Aug. 5, 1952
H. P. KUPIEC
HYDRAULIC BOOSTER FOR CONTROLLING
OPERATIONAL PARTS OF AIRCRAFT
Filed July 24, 1948
2,605,750
2 SHEETS—SHEET 1
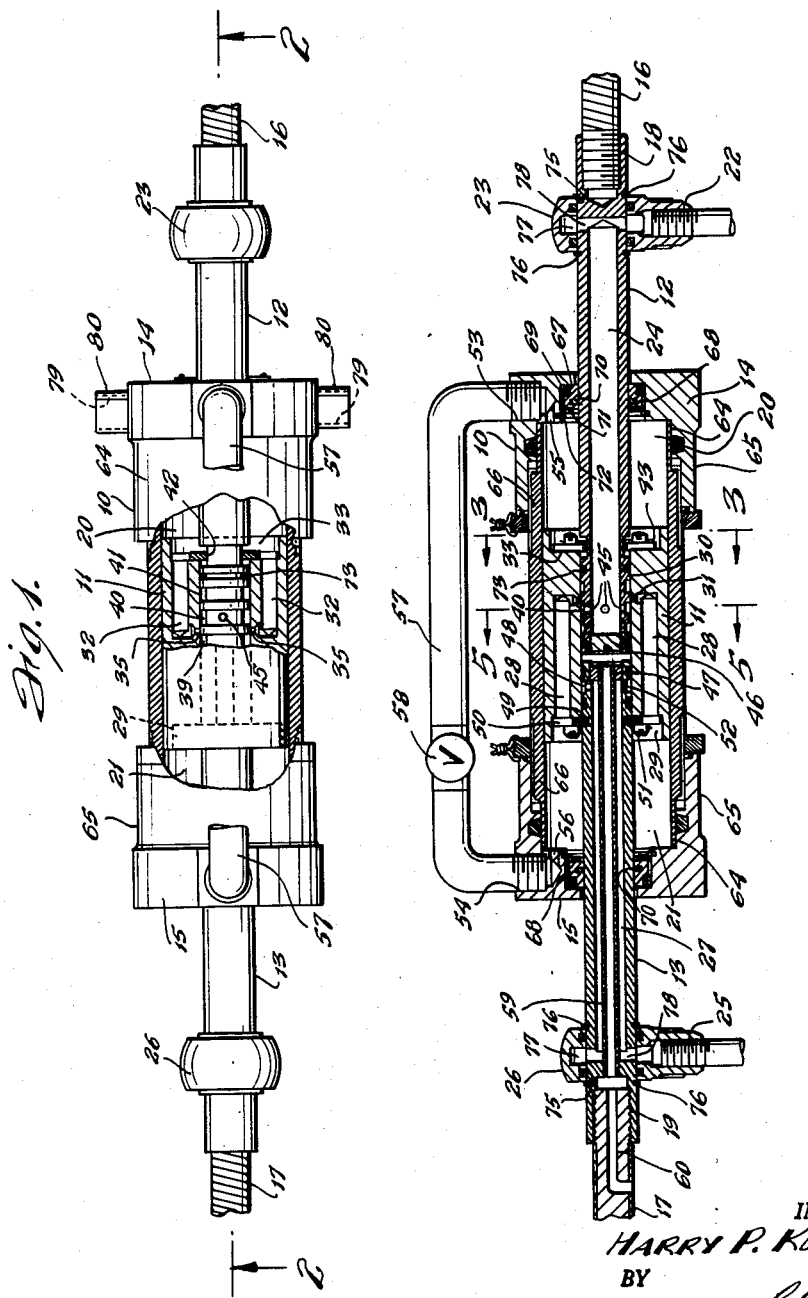
INVENTOR.
HARRY P. KUPIEC
BY
Clark & Ott
ATTORNEYS Aug. 5, 1952

H. P. KUPIEC 2,605,750

HYDRAULIC BOOSTER FOR CONTROLLING
OPERATIONAL PARTS OF AIRCRAFT

Filed July 24, 1948

INVENTOR.
HARRY P. KUPIEC
BY
Clark & Ott
ATTORNEYS

Patented Aug. 5, 1952

2,605,750

UNITED STATES PATENT OFFICE 2,605,750

HYDRAULIC BOOSTER FOR CONTROLLING OPERATIONAL PARTS OF AIRCRAFT

Harry P. Kupiec, Paramus, N. J., assignor to Air Associates, Incorporated, Teterboro, N. J., a corporation of New Jersey Application July 24, 1948, Serial No. 40,579

3 Claims. (Cl. 121—41)

This invention relates to a hydraulic booster interposed between a manual control and an operational part of an aircraft and the like for automatically moving the operational part by hydraulic pressure upon movement of the manual control therefor.

The invention comprehends a hydraulic booster for raising and lowering or moving an operational part of an aircraft such as a rudder, ailerons, elevators, elevons, wing flaps and the like.

An object of the invention is to provide a hydraulic booster connected with the control column and with an operational part by cables such as by a "push-pull" cable system whereby the control column is sensitive to the touch requiring little effort on the part of the pilot to actuate the same and a slight movement thereof places the booster in operation to move the operational part of the aircraft by hydraulic pressure.

A further object of the invention is the provision of a hydraulic booster in which a piston and a piston rod constitute the movable parts for admitting and exhausting the fluid pressure from the booster.

Another object of the invention is to provide a hydraulic booster having piston and piston rod formed with ports which are adapted to be brought into registry by movement of the piston rod by manual actuation of the manual control to thereby admit fluid pressure into the booster through the piston.

Still another object of the invention is the provision of a hydraulic booster of the indicated character in which fluid pressure inlet and return ports are swivelly connected with reciprocatory piston rods so as to permit of relative turning movement of the ports and rods and the use of flexible connections with the ports to thereby prevent binding action on the rods.

Still another object of the invention is to provide a booster of said character which operates on standard hydraulic pressures utilized in aircraft such as 1,000 to 3,000 lbs. per square inch and which booster is compact in form and light in weight and efficient for its purpose.

With the foregoing and other objects in view, reference is now made to the following specification and accompanying drawings in which the preferred embodiment of the invention is illustrated.

In the drawings:

Fig. 1 is a top plan view of a hydraulic booster constructed in accordance with the invention and with the cylinder partly broken away to show the underlying parts.

Fig. 2 is a longitudinal vertical sectional view taken approximately on line 2—2 of Fig. 1.

Figure 3:
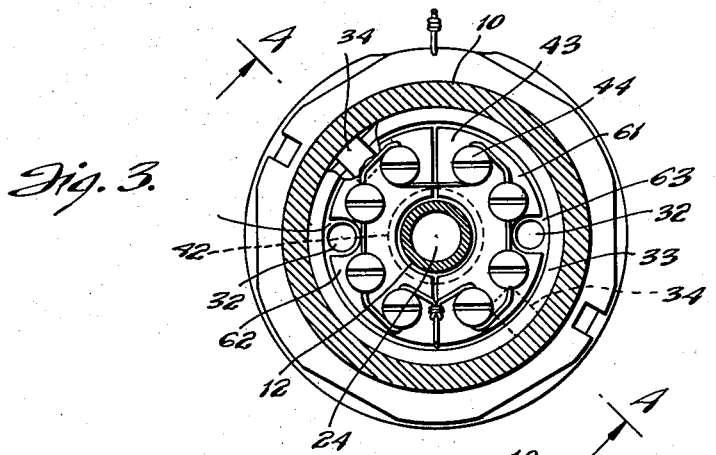
Fig. 3 is a transverse sectional view taken approximately on line 3—3 of Fig. 2.
Figure 4:
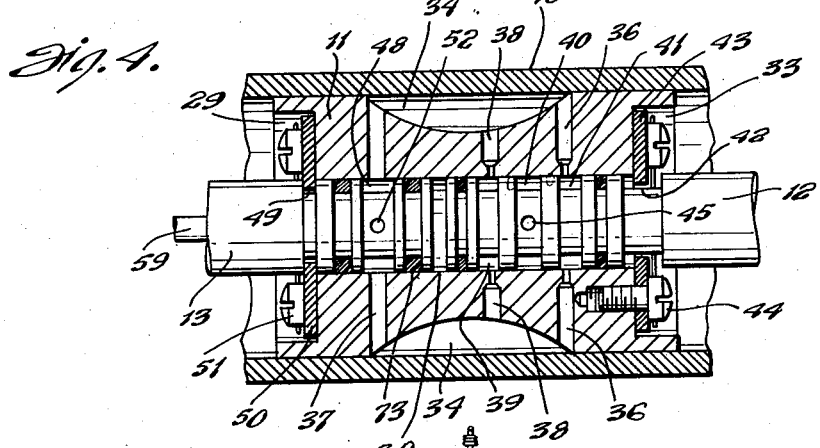
Fig. 4 is a fragmentary longitudinal sectional view taken approximately on line 4—4 of Fig. 3.
Figure 5:
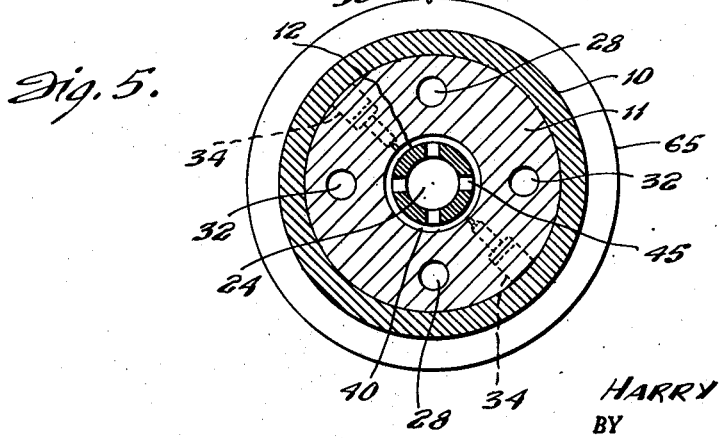
Fig. 5 is a transverse sectional view taken approximately on line 5—5 of Fig. 2.

Referring to the drawings by characters of reference, the hydraulic booster includes a cylinder 10 having a piston 11 mounted for reciprocatory movement therein and which is provided with aligned valve rod 12 and piston rod 13 projecting through the heads 14 and 15 of said cylinder. The valve rod 12 and piston rod 13 are connected respectively with the manual control column (not shown) and with the operational part of the aircraft (not shown) such as the rudder, ailerons, elevators, elevons, wing flaps and the like by cables fragmentarily indicated by the reference characters 16 and 17. The cables 16 and 17 are secured in openings 18 and 19 in the ends of the rods 12 and 13 and these cables may be a part of a "push-pull" cable system.

The piston 11 is arranged within the cylinder 10 so as to provide chambers 20 and 21 on opposite sides of the piston and hydraulic fluid is admitted to the booster through an inlet or fluid pressure port 22 provided in a fitting 23 swivelly mounted on the outer end of the valve rod 12 and which port is in communication with the hollow interior or longitudinally extending bore 24 in said rod. The hydraulic fluid is exhausted from the booster through an outlet or return port 25 provided in a fitting 26 swivelly mounted on the piston rod 13 and which outlet port is in communication with the hollow interior or bore 27 in said rod.

The piston 11 is provided with two parallel passageways 28 which open at their outer ends into the chamber 21 through the recessed end 29 of the piston and which extend inwardly therefrom a distance approximately three-fourths of the length of said piston in diametrically disposed relation on opposite sides of the central bore 30 extending longitudinally through said piston. The inner ends of the passageways 28 intersect and communicate with radially disposed ducts 31 opening at their inner ends into the central bore 30.

The piston is also provided with two parallel passageways 32 which open at their outer ends into the chamber 20 through the recessed end 33 of said piston and which extend inwardly therefrom a distance approximately midway of said piston in diametrically disposed relation intermediate the passageways 28 with the inner ends of said passageways 32 intersecting and communicating with radially arranged ducts 35 communicating at their inner ends with the central bore 30. Arranged in diametrically disposed relation between adjacent passageways 28 and 32 are two parallel grooves 34 formed in the outer periphery of the piston. The grooves 34 each have two radially arranged ducts 36 and 37 opening at their outer ends through the bottom wall thereof and communicating at their inner ends with the central bore 30. Radially arranged ducts 38 also extend through the wall of the piston communicating at their outer ends with the grooves 34 substantially medially thereof respectively and at their inner ends with the central bore 30.

The valve rod 12 has its inner end slidably mounted in the central bore 30 of the piston 11 and the inner end portion of said rod is provided with four peripheral grooves 39, 40, 41 and 42 formed in the outer periphery of the rod and extending annularly thereabout in longitudinally spaced relation with the outermost groove 42 engaged by a locking plate 43 which is secured by studs 44 against the recessed end 33 of the piston for limiting the sliding movement of the rod with reference to the piston. The valve rod is provided with a plurality of radially arranged openings 45 which communicate at their inner ends with the bore 24 and at their outer ends open into the peripheral groove 40.

The piston rod 13 has its inner end fitted in the central bore 30 of the piston 11 with the inner end thereof disposed in spaced relation from the inner end of the valve rod 12 and with the bores 24 and 27 therein respectively closed by screw plugs 46 and 47. The inner end of said rod 13 is formed with peripheral grooves 48 and 49 in the outer periphery thereof which extend annularly thereabout in longitudinally spaced relation with the outermost groove 49 engaged by a locking plate 50 secured against the recessed end 29 of the piston by studs 51 for connecting the rod to the piston. The said piston rod is provided with a plurality of radially arranged openings 52 which communicate at their inner ends with the bore 27 thereof and at their outer ends with the peripheral grooves 48.

The heads 14 and 15 of the cylinder are formed with threaded openings 53 and 54 respectively which communicate at their inner ends through reduced lateral openings 55 and 56 with the chambers 20 and 21 respectively. A conduit 57 is secured in the threaded openings 53 and 54 in the heads 14 and 15 for emergency exhausting the hydraulic pressure from the chambers 20 and 21. A valve 58 normally closes the conduit 57.

When the piston valve 12 is moved to the right by actuation of the pull cable 16, the radially arranged openings 45 in said rod are brought into registry with the radially disposed ducts 31 whereby the hydraulic pressure from the pressure port 22 is admitted through the longitudinally extending passageways 28 and thence into the chamber 21 to effect movement of the piston 11 to the right and a consequent movement of the piston rod 13 to the right so as to exert a pull on the pull cable 17 for actuation of the operating part or instrumentality of the aircraft. The movement of the piston 11 to the right forces the hydraulic fluid in the chamber 20 through the longitudinal passageways 32 and thence through the radially arranged ducts 35 into the groove 39 in the valve rod 12 and from said groove the hydraulic pressure is adapted to pass through the radially arranged ducts 38 in the piston and into the longitudinally extending grooves 34. From these grooves the hydraulic fluid passes through the ducts 37 and into the grooves 48 in the piston rod 13 and from said groove through the opening 52 and then into the bore 27 in said rod from which bore the hydraulic fluid is exhausted through the return port 25.

When the valve rod 13 is moved to the left by actuation of the pull cable 16, the radially arranged openings 45 in said rod are brought into registry with the radially disposed ducts 35 in the piston whereby the hydraulic fluid from the pressure port 22 is admitted through the longitudinally extending passageways 32 in the piston and thence into the chamber 20 to effect movement of the piston 11 to the left and consequent movement of the piston rod 13 to the left so as to move the pull cable 17 and the operational part of the aircraft. The movement of the piston 11 to the left forces the hydraulic fluid in the chamber 21 through the longitudinal passageways 28 and thence through the radially arranged ducts 31 into the groove 41 in the valve rod 12 and thence through the radially arranged ducts 36 and into the longitudinally extending grooves 34. From said grooves the hydraulic fluid passes through the radially arranged ducts 37 and thence into the groove 48 in the piston rod 13 and from said groove through the bore 27 in said rod from which the hydraulic fluid is exhausted through the return port 25.

In order to permit air to enter and to be vented from the space between the confronting ends of the valve rod 12 and piston rod 13 so that the valve rod 12 has free sliding movement in the central bore 30 of the piston 11, the piston rod 13 is provided with a vent tube 59 extending through the screw plug 47 and opening at its inner end into the space between said rods and at its outer end the tube communicates with the opening 19 in which the pull cable 17 is secured. The pull cable 17 is provided with a vent 60 opening to the atmosphere and forming a continuation of the vent passageway through the vent tube 59.

The locking plates 43 and 50 are made up of semicircular sectors 61 and 62 to permit of the emplacement thereof in the recesses 33 and 29 respectively with the inner peripheral portions thereof projecting into the grooves 42 and 50 respectively. The said sectors 61 and 62 are notched in their outer peripheries as at 63 in alignment with the longitudinally extending passageways 32 and 28 so as to permit of the flow of the hydraulic fluid through said passageways and into said chambers 20 and 21 and the exhausting of the fluid pressure therefrom.

The cylinder 10 is provided with a reduced portion 64 extending inwardly from each end which portions are adapted to snugly engage within the cylindrical wall portion 65 of the heads 14 and 15 respectively with the interiorly threaded portion 66 of said wall portions threadedly engaging the threaded outer periphery of said cylinder to close the opposite ends thereof. The heads 14 and 15 are formed with annular recesses 67 and bearing supports 68 are arranged in said recesses through which the valve rod 12 and piston rod 13 protrude. The bearing supports are annularly recessed for receiving packing rings 69 and 70 for preventing leakage of the hydraulic fluid about the value and piston rods and between said bearing supports and the heads 14 and 15. Washers 71 are disposed in abutting relation against the inner faces of said bearing supports which are secured in position by snap rings 72. The valve rod 12 and piston rod 13 are also annularly grooved to accommodate packing rings 73 to prevent leakage of the fluid pressure between the said rods and the piston.

The fittings 23 and 26 have openings 75 through which protrude the valve rod 12 and piston rod 13 respectively. The said fittings are arranged on the valve rod 12 and piston rod 13 for swivel movement but are secured against longitudinal movement thereon by snap rings 76 arranged in grooves in the rods respectively and positioned against the opposite side faces of the fittings. The fluid pressure port 22 and the return port 25 in said fittings respectively communicate with annular recesses 77 arranged in said fittings in surrounding relation with the valve and piston rods respectively. The said valve and piston rods are each formed with an opening 78 extending diametrically therethrough in alignment with said annular recesses and in intersecting relation with the outer ends of the bores 24 and 27 to thereby establish communication between the said fluid pressure and return ports and the bores 24 and 27 respectively.

The head 14 of the cylinder 10 is formed with diametrically disposed outwardly projecting lugs 79 adjacent the outer end thereof on which are mounted sleeves 80 to permit of the free rotation of the lugs therein for mounting the sleeves in fixed supports so that the cylinder 10 together with the valve rod 12 and piston rod 13 may be mounted for swinging movement about the axis of said lugs. Constructed in this manner, the valve rod 12 and piston rod 13 have free sliding movement in the ends of the cylinder in whatever angular position the cylinder is disposed. The valve rod 12 and piston rod 13 also have turning movement with reference to the cylinder 10 about their longitudinal axes and this turning movement together with the swinging movement of the cylinder prevents binding of the rods in the openings in the cylinder. The fittings 23 and 26 also being mounted for swivel turning movement prevents binding of the same thereon.

It will be understood that relative slight movement of the manual control will bring the openings 45 in the valve rod 12 into registry with the ducts 35 in the piston to thereby admit hydraulic fluid to the cylinder and effect movement of the piston and piston rod 13 in accordance with the movement of the valve rod 12. By a steady continuous movement of the manual control the piston 11 will be moved to a position at one end thereof and movement of the manual control in the opposite direction will effect movement of the piston to a position adjacent the opposite end of the cylinder.

What is claimed is:

1. In an hydraulic booster for moving an operational part of an aircraft, a cylinder, a piston mounted in said cylinder for reciprocatory movement and having a bore opening through the opposite ends thereof, valve and piston rods having their inner ends arranged in said bore in spaced relation with the outer ends thereof protruding through the opposite ends of the cylinder, said piston rod being secured in fixed relation with reference to said piston and the outer end thereof being adapted to be connected with the operational part of the aircraft and the inner end of said valve rod being mounted for longitudinal movement in said bore with the outer end thereof being adapted to be connected with a manual control, said piston having passageways opening into said bore and into the chamber at the opposite ends of the piston, said valve and piston rods having passageways opening into said bore and extending through the protruding portions thereof defining fluid pressure supply and return ports respectively and the passageways in said piston and rods being adapted to be brought into communication by the movement of said valve rod to alternate positions to thereby admit fluid to one end of the cylinder and to exhaust fluid from the other end thereof so as to effect movement of said piston and said piston rod, and a vent tube extending longitudinally through the passageway in said piston rod and opening into said space between the valve and piston rods to thereby permit air to enter and be vented from said space.

2. In an hydraulic booster for moving an operational part of an aircraft, a cylinder, a piston mounted in said cylinder for reciprocatory movement and having a bore opening through the opposite ends thereof, valve and piston rods having their inner ends arranged in said bore in spaced relation with the outer ends thereof protruding through the opposite ends of the cylinder, said piston rod being secured in fixed relation with reference to said piston and the outer end thereof being adapted to be connected with the operational part of the aircraft and the inner end of said valve rod being mounted for longitudinal movement in said bore with the outer end thereof being adapted to be connected with a manual control, said piston having passageways opening into said bore and into the chamber at the opposite ends of the piston, said valve and piston rods having passageways opening into said bore and extending through the protruding portions respectively, fittings swivelly mounted on said valve and piston rods having openings in communication with the passageways in said rods and constituting fluid pressure supply and return ports respectively and the passageways in said piston and rods being adapted to be brought into communication by the movement of said valve rod to alternate positions to thereby admit fluid to one end of the cylinder and to exhaust fluid from the other end thereof so as to effect movement of said piston and said piston rod in a direction corresponding to the movement of the valve rod, and a vent tube extending longitudinally through the passageway in said piston rod and opening into said space between the valve and piston rods to thereby permit air to enter and be vented from said space.

3. In an hydraulic booster for moving an operational part of an aircraft, a cylinder, a piston mounted in said cylinder for reciprocatory movement and having a bore opening through the opposite ends thereof, valve and piston rods having their inner ends arranged in said bore in spaced relation with the outer ends thereof protruding through the opposite ends of the cylinder, said piston rod being secured in fixed relation with reference to said piston and the outer end thereof being adapted to be connected with the operational part of the aircraft and the inner end of said valve rod being mounted for longitudinal movement in said bore with the outer end thereof being adapted to be connected with a manual control, said piston having passageways opening into said bore and into the chamber at the opposite ends of the piston, said valve and piston rods having passageways opening into said bore and extending through the protruding portions thereof defining fluid pressure supply and return ports respectively, the passageway in said valve rod being adapted to be brought into communication with the passageways respectively in said piston by the movement of said valve rod to alternate positions and said valve rod having annular recesses in the periphery of the inner end portion thereof arranged in said bore and said piston having a longitudinally extending passageway with lateral openings extending into said bore with one of said openings disposed in registry with the opening in the passageway in said piston rod and with the remainder of said lateral openings being adapted to be brought into registry with said annular recessed by movement of said valve rod to said alternate positions respectively to thereby admit fluid to one end of the cylinder and to exhaust fluid from the other end thereof so as to effect movement of said piston and piston rod in a direction corresponding to the movement of the valve rod, and a vent tube extending longitudinally through the passageway in said piston rod and opening into said space between the inner ends of the valve and piston rods to thereby permit fluid to enter and be vented from said space.

HARRY P. KUPIEC.

REFERENCES CITED

The following references are of record in the file of this patent:

UNITED STATES PATENTS

| Number | Name | Date |
|---|---|---|
| 666,348 | King et al. | Jan. 22, 1901 |
| 959,417 | Anderson | May 24, 1910 |
| 1,004,541 | Martin | Sept. 26, 1911 |
| 1,030,105 | Martin | June 18, 1912 |
| 1,394,245 | Berry | Oct. 18, 1921 |
| 1,851,816 | Dieter | Mar. 29, 1932 |
| 1,918,985 | Robson | July 18, 1933 |
| 2,220,339 | Leathem, Sr. | Nov. 5, 1940 |
| 2,318,258 | Porter | May 4, 1943 |
| 2,393,585 | Boynton et al. | Jan. 29, 1946 |
| 2,472,236 | Thomas | June 7, 1949 |